United States Patent Office 3,375,248

Patented Mar. 26, 1968

3,375,248
PHENOTHIAZINE CARBOXYLIC ACID DERIVATIVES

Jacques J. P. de Antoni, Gif-sur-Yvette, Essonne, France, assignor to Les Laboratoires Bruneau & Cie, Paris, France, a corporation of France No Drawing. Continuation-in-part of application Ser. No. 509,218, Nov. 22, 1965. This application Feb. 17, 1967, Ser. No. 616,764

Claims priority, application France, Nov. 30, 1964, 996,857, Patent 3,883; Mar. 2, 1965, 7,626, Patent 138; Sept. 13, 1965, 31,196, Patent 1,459,075; Feb. 18, 1966, 50,231; Apr. 26, 1966, 59,107; May 16, 1966, 61,761; Dec. 2, 1966, 85,945

37 Claims. (Cl. 260—243)

ABSTRACT OF THE DISCLOSURE

A compound, having anti-inflammatory and analgesic utility, selected from the class consisting of (a) phenothiazine derivatives of the formula

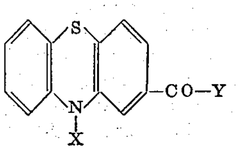

where X represents an alkanoyl radical and Y represents a group selected from the class consisting of N-methyl piperazino, N-phenyl piperazino and groups of the formula —A—$C_nH_{2n}$—Am where A represents —NH— or —O—, *n* is an integral number from 2 to 5 and Am represents a group selected from the class consisting of dialkylamino in which each alkyl group contains 1 to 4 carbon atoms, and heterocyclic nitrogen groups, and (b) non toxic acid addition salts of said phenothiazine derivatives.

This is a continuation-in-part of applicant's U.S. patent application, S.N. 509,218, filed Nov. 22, 1965, now abandoned.

This invention relates to phenothiazine carboxylic acid derivatives and to their production. It is particularly concerned with such compounds having therapeutic utility as hereinafter set forth.

In this invention use is made of phenothiazine carboxylic acid chlorides of the Formula I

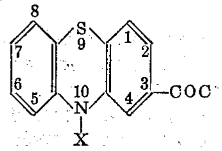

(I)

where X represents an alkanoyl group, e.g. a group selected from the class consisting of formyl, acetyl and propionyl groups, or an aryl-keto group or an aralkyl-keto group. Where X represents an aryl-keto group, said aryl group may be an unsubstituted or a substituted phenyl group such as a monohalophenyl, dihalophenyl, or methoxyphenyl, a dimethoxyphenyl or a trimethoxyphenyl group; an example of an aralkyl-keto group is phenylacétyl group. X may further represent a *n*-butyryl group, a phenyl-acetyl or a benzoyl group which may have a substituent or substituents selected from the group consisting of chlorine, methyl and methoxy while Am represents a group —NH—$C_nH_{2n}$—Am where *n* stands for 2, 3 or 4 and a Am is a N-methyl-piperazino, N-phenylpiperazino, N-benzyl-piperazino, morpholino or diethyl-amino group.

Within this class of compounds, the compound wherein X is a propionyl group, and the corresponding 3-carboxylic acid, i.e. 1-propionyl phenothiazine-3-carboxylic acid and its chloride, and also the 10-arylketo- and 10 aralkylketo phenothiazine-3-carboxylic acids and their chlorides are novel and constitute a feature of the present invention.

According to a further aspect of this feature of the invention there is provided a process for the production of 10-propionyl phenothiazine-3-carboxylic acid which comprises reacting phenothiazine-3-carboxylic acid with propionic acid chloride or propionic acid anhydride. The reaction may be carried out at a temperature from 80° C. to the temperature of reflux of the acylating agent and in the presence of a catalyst which may be either an acid for example sulphuric acid, or sodium propionate. It is also possible to carry out the reaction in the presence of a base, for example pyridine and this method is preferred when the acylating agent is propionic acid chloride. The reaction can be carried out in the absence of a solvent but where a base is used it is advantageous to provide that a diluent is present, e.g. benzene.

The 10-propionyl phenothiazine-3-carboxylic acid thus obtained may be converted to the acid chloride by reaction with phosphorus pentachloride in a medium of carbon tetrachloride at room temperature.

According to a second feature of the invention there are provided compounds of the Formula II

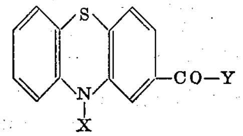

(II)

where X has the meaning assigned to it above and Y represents a group selected from the class consisting of N-methyl piperazine, N-phenyl piperazine and groups of the formula —A—$C_nH_{2n}$—Am where A represents —NH— or —O—, *n* is an integral number from 2 to 5 and Am represents a group selected from the class consisting of dialkylamino groups in which each alkyl group contains 1 to 4 carbon atoms, and heterocyclic nitrogen groups, which may contain a hetero atom additional to the said nitrogen atom e.g. pyrrolidine, piperidine, morpholine or piperazine.

According to a further aspect of this feature of the invention a compound of Formula II is obtained by reacting a compound of Formula I with a compound of the formuly HY where the symbol Y has the meaning assigned to it above.

In carrying out the said reaction, the reaction may be effected, in the presence of a diluent, e.g. an aromatic hydrocarbon or chloroform, and if appropriate in the presence of a base acting as acceptor for hydrochloric acid. The reaction mixture may then be extracted with an acid, for example aqueous hydrochloric acid, and treated with ammonia to precipitate the compound of Formula II. In other cases, the reaction mixture may be filtered if the product is insoluble, or if the product is soluble the solvent may be evaporated, after which it is taken up in water, the mixture is rendered alkaline, then the base of Formula II is extracted with a suitable solvent, e.g. chloroform. The solvent is evaporated and the base II recrystallised from a suitable solvent.

Furthermore the present invention comprises as useful industrial products particularly as intermediates for the synthesis of basic amides, phenothiazine-3-carboxylic acids having a group X in the 10-position and corresponding to the general Formula III

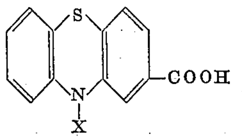

(III)

as well as the corresponding chlorides (Formula I), X having the meaning previously indicated.

According to the present invention the acids (III) can be prepared by treating phenothiazine-3-carboxylic acid with the chloride or the anhydride of the acid X—OH. The temperature which may be used is from 80° C. to the reflux temperature of the acylating agent and the reaction may be carried out in the presence of a catalyst which may be an acid, for example sulfuric acid, or a salt of an alkali metal of the acid X—OH, for example the sodium salt. It may also be carried out in the presence of a basic diluent, for example pyridine, and, in this case, the presence of a catalyst is no longer necessary.

These operations may be conducted without an intermediate medium but can also be conducted in a diluent, for example benzene.

The reaction medium is then treated whilst hot with water and a tertiary amine such as pyridine and the mixture is poured into water. The pyridine salt of the acid can then be filtered off (III), if it is insoluble, then the acid (III) liberated by treating this salt with a solution of hydrochloric acid. If the pyridine salt of the acid (III) is soluble, the medium may be acidified with hydrochloric acid. In certain cases, there is obtained a mixture of the acid (III) and the acid X—OH; one can then separate them by recrystallisation but the mixture can also be subjected directly to the action of the chlorinating agent, as is indicated below. There is obtained a mixture of chlorides of the acid (III) and the of the acid X—OH—often more convenient to separate one from the other than the acids themselves.

Also, according to the present invention, the acid chloride (I) may be prepared by treating with a chlorinating agent the corresponding phenothiazine-3-carboxylic acid alone or mixed with the acid X—OH. The chlorinating agent may be phosphorus pentachloride or thionyl chloride. Preferably, it is carried out in the presence of a diluent such as benzene, chloroform or carbon tetrachloride, at a temperature from ambient temperature to reflux temperature.

The acid chloride (I) is filtered if it is insoluble in the medium; if it is soluble, the diluent may be evaporated and the residue recrystallised in a suitable solvent. If there is present a mixture of acid chloride (I) and a compound such as the chloride of the acid X—OH or phosphorus oxychloride, this residue may be taken up in a solvent for the chloride of the acid X—OH or for phosphorus oxychloride but not for the acid chloride (I). Mostly petroleum ether or ordinary ether are suitable for this purpose. The acid chloride (I) may then be recrystallised from a suitable solvent.

According to a further feature of the invention there are provided compounds of general Formula IV

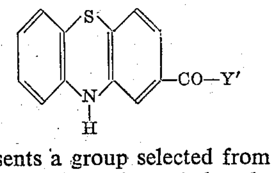

(IV)

where Y′ represents a group selected from the class consisting of N-methyl piperazine, N-phenyl piperazine and groups of the formula $—NH—C_nH_{2n}—Am$ where $n$ is an integral number from 2 to 5 and Am represents a heterocyclic nitrogen group containing a second hetero atom, for example morpholino or N-substituted piperazino such as N-methyl piperazino or N-phenyl piperazino.

According to a further aspect of this feature of the invention there is provided a process for the production of a compound of Formula IV which comprises subjecting a compound of Formula IV in which the 10 hydrogen atom is substituted by an alkanoyl group (i.e. a compound of Formula II) to de-acylation. The de-acylation may be effected for example by treatment with the calculated quantity of an alkali metal carbonate or hydroxide in an alcoholic medium, preferably under reflux conditions.

The invention further includes the acid addition salts from the basic compounds of Formulae II and III, and inorganic or organic acids which are therapeutically acceptable, i.e. non-toxic. As examples of organic acids, I shall cite maleic, fumaric, benzoic, ascorbic, succinic, bis-methylene-salicylic, methane, sulphonic, ethane disulphonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic and benzene-sulphonic acid, and as examples of inorganic acids, I shall mention hydrochloric, hydrobromic, sulphuric, sulphamic, phosphoric and nitric acids.

For producing such salts, known general methods may be employed; for example the basic compound and the acid may be reacted (a) in a water-miscible diluent such as ethanol or acetone, after which the salt is isolated by concentrating or cooling the reaction mixture, or by adding said mixture to a water-immiscible liquid such as ether, ethyl acetate or benzene, or (b) in a water-immiscible diluent such as ether, chloroform or benzene, after which the salt is separated directly. The salt may also be produced by effecting a double decomposition between a salt of the basic compound and a salt of the acid.

A particular process from producing mono- and dihydrochlorides from said basic compounds comprises reacting an acid chloride of the Formula I with a diamine or the monohydrochloride of a triamine of the formula HY, in accordance with the same process as above described but without an acceptor for hydrochloric acid. The salt may then be filtered off its insoluble, or the soluvent may be evaporated if the salt is soluble. The mono- or dihydrochloride may then be recrystallised from a suitable solvent.

The present invention relates particularly to basic amides corresponding to the general Formula V where X and Y have the same meaning as in the Formula II but where the radicle Am of the group $—NH—C_nH_{2n}—Am$ represents an aryl piperazine group of the type

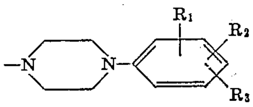

(V)

where $R_1$, $R_2$, $R_3$ may be selected from the class consisting of hydrogen, halogens such as fluorine, chlorine or bromine, lower alkyl radicles such as methyl, ethyl, N-propyl, isopropyl, n-butyl, isobutyl or tertiary-butyl residues, lower alkoxy groups such as for example methoxy, ethoxy and isopropyloxy groups, and finally the trifluoromethyl group, as well as the acid addition salts that these basic compounds form with mineral and organic acids.

These compounds are capable of being used for the same purposes as those which have been described above.

According to the invention, the compounds for which X represents an acyl group may be prepared by reacting the acid chloride corresponding to the formula

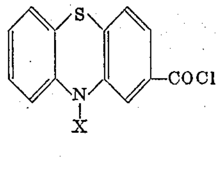

(VI)

with an (N-aryl piperazine) alkylamine HY, the symbol Y having the meaning indicated above.

The reaction may be conducted in a diluent, particularly an aromatic hydrocarbon or chloroform, if necessary in the presence of a base as a hydrogen chloride acceptor. The mixture is for example stirred for about 15 hours at ambient temperature then for 1 hour under reflux. After this, the diluent is evaporated and the residue taken up with ammonical water in order to precipitate the compound corresponding to the Formula V. The latter is then separated by filtration or extraction with a convenient solvent and recrystallised.

Besides, as regards the compounds (V) for which X represents hydrogen, they may be prepared according to two procedures, namely:

*Process a.*—The compounds corresponding to the Formula V and for which X designates an acyl radicle may be deacylated in a hydro-alcoholic medium by means of an alkali metal hydroxide in equimolecular amount; this treatment may be carried out at reflux temperature.

*Process b.*—It is applied as well to the preparation of new compounds (V) as to the preparation of the compounds indicated above for which X represents hydrogen, and the group Am of HY is an N-aryl piperazino group.

The process *b* comprises treating the esters of the phenothiazine-3-carboxylic acid with the compound HY, the symbol Y having the meaning indicated above. According to this process, an ester corresponding to the formula

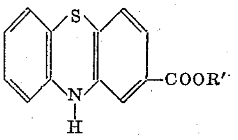

(VI*a*)

in which R′ is a lower alkyl residue having 1 to 4 carbon atoms, is heated with an (N-aryl piperazino) alkylamine in equimolecular quantity or in excess, in the presence or absence of a catalyst such as alumina or a mineral or organic salt of the compound HY; the reaction may be carried out without solvent, the reactants being melted or in the presence of an inert solvent such as an aromatic hydrocarbon, for example xylene.

According to another aspect of the invention, a new process for the preparation of esters VI*a* is provided. In this case, a 3-(α-ammonium acetyl)-10 acyl-phenothiazine corresponding to the formula

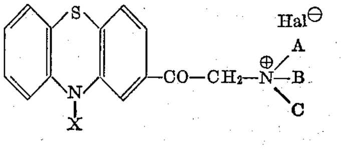

(VII)

in which:

X is an acyl group as defined above

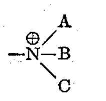

is a quaternary ammonium group such as for example a pyridinium group $Hal^{\ominus}$ is a halogen ion is reacted with an alkali metal alcoholate in excess with respect to the equimolecular quantity, in the corresponding absolute alcohol R′—OH, the symbol R′ having the previously indicated meaning. The alkali alcoholate should be in sufficient quantity to precipitate the halogen ion and moreover to act as catalyst in order to deacylate the nitrogen at 10 and to cleave the methylene pyridinium group. The total reaction is written:

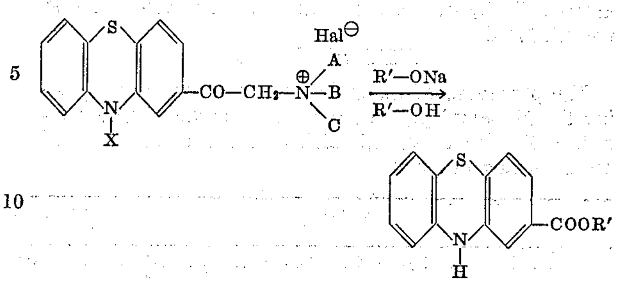

The yield of this alcoholysis is generally excellent, of the order of 85% to 90%.

Furthermore, the invention comprises a process for the preparation of (N-aryl piperazino) alkylamine corresponding to the formula

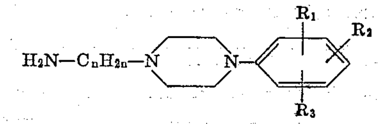

(VIII)

*n*, $R_1$, $R_2$, $R_3$ having the same meaning as indicated above.

This process comprises treating, in alcoholic medium, the disalt from a strong mineral or organic acid, and a N,N-di-β-chloro-ethyl)-amino alkylamine, particularly the dihydrochloride (IX), with the compound (X)

(IX) $H_2N—C_nH_{2n}—N(CH_2—CH_2—Cl)_2$, 2HCl (X)

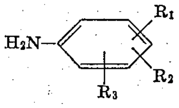

in a quantity corresponding to the production of (N-aryl piperazino) alkylamine and, preferably, both to said production and to neutralisation of the hydrochloric acid formed in the course of the reaction; however another acceptor of HCl may be used. The compound (X) or HCl acceptor is preferably added gradually to the medium as a function of the varying speed of reaction, according to the nature of the arylamine. The reaction may be accelerated by adding to the medium an alkali metal iodide as catalyst.

According to this process, I have prepared, for example, a number of (N-aryl piperazino) alkylamines, some of which are novel. These novel (N-aryl piperazino) alkylamines are defined below and form part of the invention.

Equally forming part of the invention are 3-N,N-dichloroethyl)-amino-1-propylamine dihydrochloride and the production thereof by treating 3-N,N-diethanolamino-1-propylamine dihydrochloride with a chlorinating agent, for example thionyl chloride, at ambient temperature in the presence or absence of a diluent, for example chloroform.

The following examples will serve to illustrate the invention:

EXAMPLE 1

*10-acetyl-phenothiazine-3-carboxylic acid N-methyl piperazide*

To a solution of 10-acetyl phenothiazine-3-carboxylic acid chloride (3.03 g.) in benzene is added a quantity of N-methyl piperazine sufficient to form the amide and to neutralise the hydrochloric acid formed. The mixture is stirred for about 30 minutes to 15 hours, the organic phase is extracted with dilute hydrochloric acid and the aqueous phase is neutralised with, for example, ammonia or potassium carbonate. The desired compound precipitates out: it can be isolated by extraction with a solvent for the compound, e.g. benzene or chloroform, and the solvent distilled off under reduced pressure. The product has M.P. 185° C. after recrystallisation from methyl ethyl ketone. Its hydrochloride melts with decomposition at about 180° C.

EXAMPLES 2–12

The procedure of Example 1 was followed but replacing the N-methyl piperazine by an N,N-dialkylamino alkylene diamine or an N,N-dialkyl-amino alkanol to yield the following products:

starting with 10-propionyl phenathiazine-3-carboxylic acid chloride and 3-dimethyl-amino-propanol-1 there is obtained the 3-dimethylaminopropyl ester which has a B.P. (0.5 mm. Hg) 195–195° C. Its hydrochloride has M.P. about 75–80° C. with decompostiion.

EXAMPLE 16

*Phenothiazine-3-carboxylic acid N-methyl piperazide*

To a solution in methanol or ethanol of 10-acetylphenothiazine-3-carboxylic acid N-methyl piperazide is added an equimolar quantity of sodium or potassium hydroxide and an alkali metal carbonate. The mixture is refluxed for about 10 minutes, the alcohol distilled off under reduced pressure, the residue taken up in wtaer to dissolve the mineral salts therein and the organic product extracted with chloroform and the chloroform driven off under reduced pressure.

| Ex. | Amine | M.P., crystallisation solvent | Acid addition salt, M.P., crystallisation solvent |
|---|---|---|---|
| 2 | N,N-dimethyl ethylene diamine | 105–110° C. (tetrachloroethylene). | Hydrochloride, M.P. 233° C. (approx.) (ethyl acetate plus ethanol). |
| 3 | N,N-diethyl ethylene diamine | do | Hydroch.oride, M.P. 192–193° C. (isopropyl alcohol plus ethyl acetate). |
| 4 | N,N-dimethyl 1,3-propylene diamine | 113–115° C. (isopropyl ether) | Hydrochloride, M.P. 140–145° C. (acetone). |
| 5 | N,N-diethyl 1,3-propylene diamine | 108–112° C. (isopropyl ether) | Acid maleate, M.P. 132–135° C. (isopropyl alcohol plus ethyl acetate). |
| 6 | 2-dimethylamine ethanol | 88–90° C. (ethanol) | Hydrochloride, M P. 184–186° C. (ethanol plus ethyl acetate). |
| 7 | 2-diethylamino ethanol | 92–94° C. (ethanol) | Hydrochloride, M.P. 160–165° C. (isopropyl alcohol plus ethyl acetate). |
| 8 | 3-dimethylamino propanol-1 | 128° C. (ethyl acetate) | Hydrochloride, M.P. 182° C. (ethyl acetate plus isopropyl alcohol). |
| 9 | do | Oily product | Hydrochloride, M.P. 90–95° C. |
| 10 | 2-morpholino ethanol | 50–55° C | Hydrochloride, M.P. 200–205° C. (isopropyl alcohol plus ethyl acetate). |
| 11 | 3-morpholino propanol-1 | 50–55° C | Hydrochloride, M.P. 188–190° C. (approx.) (isopropyl alcohol). |
| 12 | 3-morpholino-1-aminopropane | 158° C. (methyl ethyl ketone) | Hydrochloride, M.P. 208° C. (approx.) (isopropyl alcohol). |

EXAMPLE 13

*10-propionyl-phenothiazine-3-carboxylic acid*

*Method* (*a*).—A mixture of 48.6 g. phenothiazine-3-carboxylic acid, 110 g. propionic anhydride and 0.3 ml. sulphuric acid is heated at 120° C. for an hour. The solution is evaporated under reduced pressure. The residue is taken up in 100 ml. pyridine and 100 ml. water, the mixture is stirred at 85° for 45 minutes, then cooled and acidified with dilute hydrochloric acid. The precipitate is filtered, dried and recrystallised from methyl ethyl ketone. It has M.P. 196° C.

*Method* (*b*).—A mixture of 48.6 g. phenothiazine-3-carboxylic acid, 110 g. propionic acid anhydride and 1 g. sodium propionate is heated at 120° C. for 2 hours. The solution is evaporated under reduced pressure and the residue treated as in method (*a*).

*Method* (*c*).—A solution of 48.6 g. phenothiazine-3-carboxylic acid in 486 ml. of benzene and 98 ml. of pyridine is treated, with cooling, with 22.2 g. of propionic acid chloride. The mixture is heated to reflux from 30 minutes, cooled, filtered, washed with water and evaporated under reduced pressure. The residue is recrystallised from methyl ethyl ketone.

EXAMPLE 14

*10-propionylphenothiazine-3-carboxylic acid chloride*

A mixture of 31.8 g. of 10-propionylphenothiazine-3-carboxylic acid, 160 ml. of carbontetrachloride and 23 g. of phosphorus pentachloride is strongly stirred at room temperature for 3 hours. The solution is evaporated under reduced pressure to a small volume, the residue is taken up in petroleum ether and crystalline product is filtered off, M.P. 110° C. after recrypstallization from ether.

EXAMPLE 15

By proceeding in the same manner as Examples 1–12

The product has M.P. 146–147° C. after recrystallisation from a mixture of ethyl acetate and ether. The hydrochloride has M.P. about 218° C. after recrystallisation from a mixture of isopropyl alcohol and ethanol. It is obtained as yellow crystals.

EXAMPLE 17

*10-acetyl phenothiazine-3-carboxylic acid* (*2-morpholino*) *ethylamide*

To a solution of 10-acetyl-phenothiazine-3-carboxylic acid chloride (3.03 g.) in chloroform is added 2-morpholinoethylamine in a quantity calculated to form the amide and neutralise the hydrochloric acid formed in the reaction. The mixture is stirred for 30 minutes to about 15 hours, the chloroform exaporated, the residue taken up in dilute hydrochloric acid, the solution extracted with ether and the aqueous phase neutralised with potassium carbonate. The product precipitates and is isolated by extraction with a solvent, e.g. chloroform, the solvent driven off under reduced pressure and the product recrystallised.

EXAMPLES 18–24

By applying the technique of Example 17 but replacing the 2-morpholino-ethylamine by other amines corresponding compounds are obtained. All the products of Examples 17–24 are described below, together with their salts:

| Ex. | Amine | M.P., Recrystallisation solvent | Acid addition salt, M.P., Recrystallisation solvent |
|---|---|---|---|
| 17 | 2-morpholino-ethylamine | 180° C. (ethanol) | Hydrochloride, about 240° C. (ethanol). |
| 18 | 2-(N-methyl-piperazino) ethylamine | Oily | Dihydrochloride, about 214° C. (ethanol). |
| 19 | 3-N-methyl-piperazino-propylamine-1 | 65–68° C. amorphous | Dihydrochloride, about 240° C. (ethanol). |
| 20 | 3-piperidino-proylamine-1 | 150° C. (ethyl acetate) | Hydrochloride, about 176° C, (isopropanol). |
| 21 | 3-pyrrolidino-propylamine-1 | 143° C. (ethyl acetate) | Hydrochloride, about 194° C. (isopropanol). |
| 22 | 4-diethylamino butylamine-1 | 108° C. (ether and methyl ethyl ketone). | Maleate, about 74° C. |
| 23 | 3-N-methyl-piperazino-propanol-1 | Oily | Dihydrochloride, about 208° C. (isopropanol). |
| 24 | 3-dimethyl-amino-2-methyl propanol-1 | do | Hydrochloride about 186° C. (methyl ethyl ketone and ethanol). |

EXAMPLE 25

*10-acetyl phenothiazine-3-carboxylic acid N-phenyl piperazide*

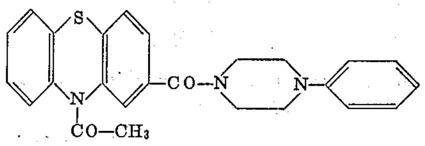

To a solution of 10-acetyl phenothiazine-3-carboxylic acid chloride (3.03 g.) there is added N-phenylpiperazine in the quantity calculated as necessary to form the amide and neutralise the hydrochloric acid formed. The mixture is stirred for about 15 hours, the chloroform evaporated, the residue taken up in dilute hydrochloric acid, the solution extracted with ether and the aqueous phase neutralised with potassium carbonate. The product precipitates and is isolated by extraction with a solvent, advantageously chloroform, and the solvent then driven off under reduced pressure. The product is recrystallised.

EXAMPLES 26–36

By following the provision of Example 25 but replacing the N-phenyl piperazine with other amines and replacing the 10-acetylphenothiazine-3-carboxylic acid chloride with 10-propionyl-phenothiazine-3-carboxylic acid chloride and stirring for a period of 30 minutes to 15 hours as may be appropriate, corresponding compounds are obtained.

All the compounds of Examples 26–36 are described below together with their salts. The salts can be obtained from the bases by known methods. The products have therapeutic utility.

| Ex. | Amine | Alkanoyl group | M.P., recrystallisation solvent | Acid addition salt, M.P., recrystallisation solvent |
|---|---|---|---|---|
| 25 | N-phenylpiperazine | Acetyl | 237° C. (Dimethyl-formamide) | Hydrochloride, 150° C. (decomp.). |
| 26 | 2-N-phenylpiperazino-ethylamine | do | 188° C. (Ethanol) | Hydrochloride, 255° C. (ethanol). |
| 27 | 3-N-phenylpiperazino-propylamine-1 | do | 196° C. (Dimethylformamide) | Hydrochloride, 216–7° C. (ethanol). |
| 28 | 4-morpholino-butyl-amine-1 | do | 90° C. (amorphous) | Maleate 175° C. (Ethyl acetate and ethanol). |
| 29 | 3-diethylamino-propylamine-1 | Propionyl | 104° C. (isopropyl ether) | Maleate (very hygroscopic). |
| 30 | 2-morpholino-ethylamine | do | 50–60° C. (amorphous) | Hydrochloride 228° C. (ethanol). |
| 31 | 3-morpholino-propylamine-1 | do | 155° C. (ethyl acetate) | Hydrochloride 220° C. (ethanol). |
| 32 | 2-N-methylpiperazine-ethylamine | do | 70–80° C. (amorphous) | Dihydrochloride, 233° C. (ethanol). |
| 33 | 3-N-methylpiperazine-propylamine-1 | do | 70–75° C. (amorphous) | Dihydrochloride, 220° C. (ethanol). |
| 34 | 2-N-phenylpiperazino-ethylamine | do | 90–95° C. (amorphous) | Hydrochloride, 228° C. (methanol). |
| 35 | 3-N-phenylpiperazino-propylamine-1 | do | 173° C. (ethyl acetate) | Hydrochloride, 234° C. (ethanol). |
| 36 | 2-dimethylamino-propanol-1 | Acetyl | Viscous liquid | Hydrochloride, 152° C. (methyl ethyl ketone). |

EXAMPLE 37

*Phenothiazine-3-carboxylic acid N-phenyl piperazide*

10-acetyl phenothiazine-3-carboxylic acid N-phenyl piperazide (15 g.: 35 millimols), M.P. 237° C., is dissolved in 1600 ml. of methanol. The solution is heated to reflux and there is added during 10 minutes a solution of 36 millimols of potassium hydroxide in 100 ml. water. After refluxing for 30 minutes the methanol is evaporated to the point of crystallisation of the residue, the residue is then filtered off and the product recrystallised from chloroform.

EXAMPLE 38

*Phenothiazine-3-carboxylic acid-N-β-morpholino-ethylamine*

10-acetyl phenothiazine - 3 - carboxylic acid-N-β-morpholinoethyl amide (39.7 g.: 0.1 mol) is dissolved in ethyl alcohol (95% strength). The solution is heated to reflux and there is added, during 10 minutes, an aqueous solution of 0.1 mol potassium hydroxide. After refluxing for 10 minutes, the solvent is driven off, the residue taken up in water and crystallised. It is recrystallised from methylethyl ketone.

The same procedure is adapted replacing the indicated amide by 10-propionyl-phenothiazine-3-carboxylic acid β-morpholinoethyl amide (41.1 g.: 0.1 mol).

EXAMPLES 39–44

By applying the same technique as in Example 38 but replacing the morpholinoethylamide with other amides corresponding compounds are obtained. The melting points of all the compounds of Examples 37–44, as well as their salts, are set out in the following table:

| 1 | YH Amine | M.P.° C., Recrystallisation solvent | Acid Addition salt, M.P.° C., recrystallisation solvent |
|---|---|---|---|
| 37 | N-phenyl piperazine | 232° chloroform | Hydrochloride 190–200° (decomp.). |
| 38 | 2-morpholino-ethylamine | 183° methyl ethyl ketone | |
| 39 | 3-morpholino-propylamine-1 | 182° methyl ethyl ketone | Hydrochloride 240° methanol. |
| 40 | 4-morpholino-butylamine-1 | 156–7° ethyl acetate | Acid maleate 100° (decomp.). |
| 41 | 2-(N-methyl piperazino)-ethylamine | 174° methyl ethyl ketone | Dihydrochloride 242° methanol. |
| 42 | 3-(N-methyl piperazino)-propylamine-1 | 202° chloroform | Dihydrochloride 260° ethanol. |
| 43 | 2-(N-phenyl piperazino)-ethylamine | 228° chloroform | Hydrochloride 260° methanol. |
| 44 | 3-(N-phenyl piperazino)-propylamine-1 | 194° methyl ethyl ketone | Hydrochloride 243°. |

EXAMPLE 45

(A) *10-butyryl-phenothiazine-3-carboxylic acid*

*Process a.*—A mixture of 48.6 g. phenothiazine-3-carboxylic acid, 200 g. butyric anhydride and 0.3 ml. of sulfuric acid (or 2 g. of sodium butyrate) is heated at about 120° C. for 2 hours. The solution is evaporated under reduced pressure: the residue is taken up with 100 ml. of pyridine and 25 ml. of water; the mixture is stirred at about 85° C. for 45 minutes, then cooled and acidified with dilute hydrochloric acid. The precipitate is filtered, dried and recrystallised from methyl ethyl ketone. Melting point 180° C.

*Process b.*—A solution of 48.6 g. of phenothiazine-3-carboxylic acid in 486 ml. of benzene and 98 ml. of pyridine is treated, with cooling, with 25 g. of butyric acid chloride. The mixture is heated under reflux for 30 minutes then cooled, filtered, washed with water and evaporated under reduced pressure. The residue is recrystallised from methyl ethyl ketone.

(B) *Acid chloride*

A mixture of 31.3 g. of 10-butyryl-phenothiazine-3-carboxylic acid, 160 ml. of carbon tetrachloride and 23 g. of phosphorus pentachloride is vigorously stirred at room temperature for an hour and a half; the solution is evaporated under reduced pressure to small volume and the residue is taken up in petroleum ether. The crystalline product is filtered and recrystallised from isopropyl ether. Melting point 108° C.

EXAMPLE 46

(A) *10-benzoyl phenothiazine-3-carboxylic acid*

*Process a.*—A mixture of 48.6 g. of phenothiazine-3-carboxylic acid, 250 g. of benzoyl chloride and 0.3 ml. of sulfuric acid is heated at about 110° C. for 3 hours.

The solution is evaporated under reduced pressure, the residue is taken up with 100 ml. of pyridine and 25 ml. of water and the mixture is stirred at about 85° C. for 30 minutes. It is diluted with water, extracted with ether and filtered; the precipitate is taken up with dilute hydrochloric acid then recrystallised from acetone. Melting point 230° C.

*Process b.*—A solution of 48.6 g. of phenothiazine-3-carboxylic acid in 200 ml. of pyridine is treated with 112 g. of benzoyl chloride with cooling. The mixture is heated at about 90° C. for 4 hours then 30 ml. of water are added and it is kept at 90° C. for 30 minutes. It is diluted with water, extracted with ether and filtered; the precipitate is taken up with aqueous hydrochloric acid then recrystallised from acetone.

(B) *Acid chloride*

A mixture of 34.7 g. of 10-benzoyl-phenothiazine-3-carboxylic acid, 70 ml. of carbon tetrachloride and 18 ml. of thionyl chloride is heated under reflux for 1 hour. The acid chloride is cooled and filtered. Melting point 170° C.

The same result is obtained by treating the acid with the theoretical amount of phosphorus pentachloride in carbon tetrachloride for 48 hours at room temperature.

EXAMPLE 47

(A) *10-(4-chloro - benzoyl) - phenothiazine-3-carboxylic acid*

This acid is prepared according to method A or B of Example 46 except for the following alteration: the water-pyridine solution is acidified with hydrochloric acid and the mixture of 4-chlorobenzoic acid and 10-(4-chlorobenzoyl)-phenothiazine-3-carboxylic acid which precipitates is filtered and dried.

The 10-(4-chlorobenzoyl) - phenothiazine-3-carboxylic acid may be purified by recrystallization from ethyl acetate. Melting point 210–220° C.

(B) *Acid chloride*

The 10-(4-chloro-benzoyl)-phenothiazine-3-carboxylic acid or a mixture of this acid with 4-chloro-benzoic acid is treated in carbon tetrachloride under reflux for one hour with thionyl chloride, in an amount corresponding to about twice the theoretical quantity necessary to transform the carboxylic acids into their chlorides. The solution is evaporated under reduced pressure, the residue taken up with petroleum ether and the precipitate recrystallised from carbon tetrachloride. Melting point 178° C.

The same result is attained by treating 10-(4-chlorobenzoyl)-phenothiazine-3-carboxylic acid with phosphorus pentachloride in the theoretical amount, in carbon tetrachloride, for twenty-four hours, at room temperature. The solvent is evaporated under reduced pressure, the residue taken up with petroleum ether and the precipitate recrystallised from carbon tetrachloride.

EXAMPLE 48

*10-(2,4 - dichloro - benzoyl) - phenothiazine-3-carboxylic acid and its chloride*

This acid and its corresponding chloride may be prepared according to the method described in Example 47.

The 10-(2,4-dichloro-benzoyl)-phenothiazine - 3 - carboxylic acid has a melting point of 248° C. after recrystallisation from ethyl acetate. Its chloride has a melting point of 158° C. after recrystallisation from carbon tetrachloride.

EXAMPLE 49

*10-(3,4,5-trimethoxy - benzoyl) - phenothiazine - 3 - carboxylic acid and its chloride*

This acid and the corresponding chloride may be prepared according to the methods described in Example 47.

The 10-(3-4-5-trimethoxy-benzoyl) - phenothiazine-3-carboxylic acid has a melting point of 222° C. after recrystallisation from 95% ethanol. Its chloride has a melting point of 130° C. after recrystallisation from cyclohexane.

EXAMPLE 50

*10-(3,4-dimethoxy-benzoyl)-phenothiazine-3-carboxylic acid and its chloride*

The 10-(3,4-dimethoxy-benzoyl) - phenothiazine-3-carboxylic acid is prepared according to the methods described in Example 47. Its melting point is 206° C. after recrystallisation from ethyl acetate.

Its chloride may be prepared as described in Example 47. This is separated from the veratric acid chloride by taking up with ether the residue obtained by evaporation of the carbon tetrachloride solution. The veratric acid chloride is soluble under these conditions while the desired acid chloride is only very slightly soluble. The precipitate is recrystallised from benzene. Melting point 177° C.

EXAMPLE 51

*10-(4-methoxy-benzoyl)-phenothiazine-3-carboxylic acid and its chloride*

The 10 - (4 - methoxy - benzoyl) - phenothiazine-3-carboxylic acid is prepared according to the methods described in Example 47. Its melting point is 268° C. after recrystallisation from methyl ethyl ketone.

Its chloride may be prepared as described in Example 6. Melting point 178°, after recrystallisation from carbon tetrachloride.

EXAMPLE 52

*10-(2-phenyl-acetyl)-phenothiazine-3-carboxylic acid and its chloride*

The 10-(2-phenyl-acetyl) - phenothiazine-3-carboxylic acid may be prepared as in Example 47. Its melting point, after extraction with hot petroleum ether and recrystallisation from ethyl acetate, is 187° C.

Its chloride is prepared as is described in Example 45. It is purified by extraction by means of hot isopropyl ether and recrystallisation from a mixture of benzene and petroleum ether. Its melting point is 108° C.

EXAMPLE 53

*3-(N-methyl piperazino)-propylamide of 10-butyryl-phenothiazine-3-carboxylic acid*

To a chloroform solution of 33.1 g. of the chloride of 10-butyryl-phenothiazine-3-carboxylic acid is added 3-(N-methyl piperazino)-1-propylamine (or its monohydrochloride) in an amount calculated to form the amide and to neutralize the hydrochloric acid formed. Stirred for about 3 hours, the chloroform evaporated, the residue taken up with a dilute solution of hydrochloric acid, this solution is subjected to extraction with ether and the aqueous phase neutralized with an alkali metal carbonate; the desired compound precipiates; it is isolated by extraction by means of one of its solvents, viz. chloroform, then the solvent distilled off under reduced pressure. The residue is recrystallised.

EXAMPLES 54–65

There is used the chloride of a phenothiazine-3-carboxylic acid having in the 10 positions an acyl radical which may be different from the butyryl radical.

Besides, as the case may be the 3-(N-methyl piperazino)-1-propylamine is replaced by another tertiary amino compound which may be used in the form of a monosalt if it is a triamine.

The reaction of the acid chloride and of the tertiary amino compound may be carried out according to the technics described in Example 53.

The corresponding compounds as well as one of their salts are shown in the following Table I.

TABLE I

| Example | 10-substituent, X—COOH | t-Amine compound, Y—H | M.P. (state, in case of a non-crystalline compound recrystallisation solvent | Acid addition salt, M.P., recrystallisation solvent |
|---|---|---|---|---|
| 53 | Butyric acid | 3-(N-methyl piperazino) propylamine-1 | 80–90° C. (amorphous) | Dihydrochloride, 215–220° C., ethanol-acetate ethyl. |
| 54 | Benzoic acid | 3-diethylamino propylaminej1 | do | Neutral fumarate, 158° C., ethanol. |
| 55 | do | 4-diethylamino butylamine-1 | 115° C. (ethyl acetate) | 172–174° C. acetone. |
| 56 | 4-chloro-benzoic acid. | 4-(N-methyl piperazino) propylamine-1 | 110–120° C. (amorphous) | Dihydrochloride, 225–235° ethanol ethyl acetate. |
| 57 | Benzoic acid | 2-morpholino ethylamine | 176° C. (acetone) | Hydrochloride, 255–260° C., methanol. |
| 58 | do | 3-(N-phenyl piperazino) propylamine-1 | 194° C. (dimethyl formamide). | |
| 59 | do | 2-(N-benzyl piperazino)-ethylamine | 30–40° C. (amorphous) | Dihydrochloride, 218–220° C., methanol. |
| 60 | do | 4-morpholino butylamine-1 | 148° C. (ethyl acetate) | Acid fumzrate, 217° C., ethanol. |
| 61 | do | 2-(N methyl piperazino) ethylamine | 173° C. (ethyl acetate) | Dihydrochloride 238–242° C., methanol. |
| 62 | do | 2-(N-phenyl piperazino) ethylamine | 178° C. (methyl ethyl ketone). | |
| 63 | do | 3-(N-methyl piperazino) propylamine | 95–100° C. (amorphous) | Dihydrochloride, 214–218° C., ethanol ethyl acetate. |
| 64 | do | 4-(N-methyl piperazino) butylamine-1 | 90–95° C. (amorphous) | Dihydrochloride, 232–238° C., methanol. |
| 65 | do | 3-morpholino propylamine-1 | 80–90° C. (amorphous) | Hydrochlor de 226–228° C., ethanol. |

EXAMPLE 66

(A) *10-(p-toluyl)-phenothiazine-3-carboxylic acid*

*Process a.*—A mixture of 24.3 g. of phenothiazine-3-carboxylic acid, 154 g. of p-toluic acid chloride and 0.2 ml. of concentrated sulphuric acid is heated to about 110° C. for 3 hours. The solution is evaporated under reduced pressure, the residue is taken up with 45 ml. of pyridine and 10 ml. of water, and the mixture is stirred at about 85° C. for 30 minutes. It is diluted with water, filtered and the precipitate washed with 40 ml. of ether. The precipitate is taken up in 100 ml. of N-hydrochloric acid. It is filtered, washed with water and dried to yield a mixture of p-toluic acid and the desired acid. The latter may be purified by recrystallisation from methyl ethyl ketone. Its melting point is 256° C.

*Process b.*—A solution of 24.3 g. of phenothiazine-3-carboxylic acid in 100 ml. of pyridine is treated with 60 g. of p-toluic acid chloride, with cooling. The mixture is then heated at about 90° C. for 4 hours, then 15 ml. of water added and it is kept at about 90° C. for 30 minutes. It is diluted with water, filtered and washed with ether. The precipitate is taken up with dilute hydrochloric acid. The mixture of the desired acid and the p-toluic acid is filtered washed and dried.

(B) *Acid chloride*

The 10-(p-toluyl)-phenothiazine-3-carboxylic acid or a mixture of this acid with p-toluic acid is treated in carbon tetrachloride under reflux, for 3 hours, with thionyl chloride in an amount corresponding to approximately twice the theoretical quantity necessary to convert the carboxylic acids into their chlorides. The solution is evaporated under reduced pressure, the residue taken up with petroleum ether and the precipitate recrystallised from chloroform. Its melting point is 135° C.

The same result is obtained by treating 10-(p-toluyl)-phenothiazine-3-carboxylic acid, alone or in the presence of p-toluic acid, with the theoretical quantity of phosphorus pentachloride in carbon tetrachloride for 48 hours at room temperature. The solvent is evaporated under reduced pressure, the residue is washed with petroleum ether and recrystallised from chloroform.

EXAMPLE 67

*10-(o-toluyl)-phenothiazine-3-carboxylic acid and its chloride*

This acid and the corresponding chloride may be prepared according to the methods described in Example 66; 10-(o-toluyl)-phenothiazine-3-carboxylic acid has a melting point of 200–202° C. after recrystallisation from a mixture of carbon tetrachloride and cyclohexane. Its chloride melts at 134° C. after having been recrystallised from ether.

EXAMPLE 68

*10-(m-toluyl)-phenothiazine-3-carboxylic acid and its chloride*

This acid and the corresponding chloride may be prepared according to the method described in Example 66; 10-(m-toluyl)-phenothiazine-3-carboxylic acid has a melting point of 173–175° C. after recrystallisation from a mixture of methyl ethyl ketone and petroleum ether. Its chloride melts at 120° C. after having been recrystallised from benzene.

EXAMPLE 69

*10-(3,4-dimethoxy-benzoyl)-phenothiazine-3-carboxylic acid 3-(N-methyl-piperazino)-propylamide*

To a chloroform solution of 0.1 mole of 10-(3,4-dimethoxy-benzoyl)-phenothiazine - 3 - carboxylic acid is added 0.1 mole of 3-(N-methyl-piperazino)-propylamine-1 or of its mono-hydrochloride. The mixture is stirred for about 3 hours, then the chloroform evaporated. At this moment of the operation, according to whether it is desired to obtain the basic product or its hydrochloride, the following procedure is followed:

In the first case the residue is taken up with water and the desired product precipitated with an akali metal carbonate. This product is extracted by means of one of its solvents, to wit chloroform, then the solvent is distilled under reduced pressure. The residue is recrystallised from ethyl acetate.

In the second case the residue is directly recrystallised from a methanol-ethanol mixture.

EXAMPLES 70–78

The chloride of a phenothiazine carboxylic acid having in the 10-position an acyl radical which may be different from the 3,4-dimethoxy benzoyl radical is used.

Besides 3-(N-methyl-piperazino)-propylamine-1 is replaced as the case may be by another tertiary-amine compound which may be used in the form of a monosalt in the case of a triamine.

The reaction of the acid chloride and the tertiary amine compound may be conducted according to the technics described in Example 69.

The corresponding compounds and one of their salts are listed in the following table:

TABLE II

| Ex. | Acid X—OH from which 10-substituent is derived | Y—H Tertiary-amino compound | M.P. (state, in case of a non-crystalline compound), solvent for recrystallisation | Acid addition salt, M.P., solvent for recrystallisation |
|---|---|---|---|---|
| 69 | 3,4-dimethoxy benzoic acid. | (N-methyl-piperazino)-3 propylamine-1 | 162° C. (ethyl acetate) | Dihydrochloride, 206–210° C., methanol-ethanol. |
| 70 | Phenylacetic acid | do | 80–90° C. (amorphous) | Dihydrochloride, 222–225° C., methanol-ethanol. |
| 71 | 2,4 dichloro benzoic acid. | do | 90–100° C. (amorphous) | Dihydrochloride, 230–250° C., methaaol. |
| 72 | 3,4,5, trimethoxy benzoic acid. | do | 80–90° C. (amorphous) | Dihydrochloride, 215–230° C., ethanol. |
| 73 | 4 methoxy benzoic acid. | do | do | Dihydrochloride, 200–220° C., ethanol. |
| 74 | p-Toluic acid | do | do | Dihydrochloride, 200–215° C., ethanol. |
| 75 | do | 2-(N-methyl-piperazino) ethylamine | 160–162° C. (ethyl acetate) | Dihydrochloride 230–245° C., 95% ethanol. |
| 76 | o-Toluic acid | 3-(N-methyl-piperazino) propylamine-1 | 80–90° C. (amorphous) | Dihydrochloride, 235–250° C., 95% ethanol. |
| 77 | do | 2-(N-methyl-piperazino) ethylamine | 105–110° C. (amorphous) | Dihydrochloride, 260–270° C., 90% ethanol. |
| 78 | m-Toluic acid | do | 172–174° C. (ethyl acetate) | Dihydrochloride, 220–235° C., 90% ethanol. |

EXAMPLE 79

*3-(N-(4-chloro-phenyl)piperazino)-propylamide of 10-acetyl phenothiazine 3-carboxylic acid*

To a chloroform solution of 10-acetyl-phenothiazine-3-carboxylic acid (3.03 g.) an equimolecular quantity of 3-(N-(4-chlorophenyl)piperazino)-propylamine-1 (2.5 g.) is added with stirring, at room temperature. The mixture is left for 15 hours at this temperature then refluxed for 1 hour. The chloroform is evaporated, the residue taken up with water and the basic compound liberated from its hydrochloride by an alkali metal carbonate or ammonia. The product is then extracted by one of its solvents, to wit a chloroform, then the solvent is distilled off under reduced pressure. Residue is recrystallised from ethyl acetate.

EXAMPLES 80–99

The chloride of a phenothiazine-3-carboxylic acid having at the 10-position an acyl radical which may be different from the acetyl radical is used. The 3-(N-(4-chlorophenyl) piperazino)-propylamine-1 is replaced as the case may be by another amine compound HY.

The reaction of the acid chloride and of the compound HY may be carried out according to the technics described for Example 79.

The corresponding compounds thus prepared are shown in the following Table II.

EXAMPLE 100

*3-(N-(4-chloro-phenyl)piperazino)-propylamide of phenothiazine-3-carboxylic acid*

*Process a.*—To a mixture of 0.1 mole of 3-(N-(4-chloro-phenyl) - piperazino) - propylamide of 10-acetyl-phenothiazone-3-carboxylic acid and 500 ml. of methanol there is added, in 10 minutes with stirring and at reflux temperature, 0.1 mole of potassium hydroxide in 0.5 N aqueous solution. The reflux is maintained for 30 minutes more and the product is filtered after cooling. It is recrystallised from a mixture of dimethyl formamide and methyl ethyl ketone.

The same result is obtained by replacing the indicated amide by 3 - (N - (4-chloro-phenol)-piperazine)-propylamide of 10-propionyl-phenothiazine-3-carboxylic acid.

*Process b.*—There is kept under reflux for 20 hours, under a current of nitrogen and with stirring, a mixture of 0.1 mole of methylester of phenothiazine-3-carboxylic acid, 25.3 g. (0.1 mole) of 3-(N-(4-chloro-phenol)-piperazine)-1-propylamine and 25 ml. of pure xylene. The reflux is maintained for 20 hours and the methanol formed in the course of the reaction is collected. The mixture is then cooled and diluted by about 25 ml. of methyl ethyl ketone and then the crystalline product is filtered and recrystallised as in the procedure *a*.

The same result is obtained in replacing the methylester of phenothiazine-3-carboxylic acid with the ethyl, TABLE II (continued)

| Number of Example (Code) | Acid X—OH from which the 10-substituent is derived | Tertiary amino-compound HY | Melting point, recrystallisation solvent |
|---|---|---|---|
| 79 (3100) | Acetic acid | 3-[N-(4-chloro-phenyl)piperazino]-1-propylamine | 159° C., Me-Et-Ketone. |
| 80 (3104) | Propionic acid | do | 168° C., Me-Et-Ketone. |
| 81 (3168) | Acetic acid | 3-[N-(3-chloro-phenyl)piperazino]-1-propylamine | 187° C., Me-Et-Ketone. |
| 82 (3103) | Propionic acid | do | 138–139° C., ethyl-acetate. |
| 83 (3105) | Acetic acid | 3-[N-(2-chloro-phenyl)piperazino]-1-propylamine | 130° C., crystallises in ether. |
| 84 (3113) | Propionic acid | do | 143–144° C., ethyl acetate. |
| 85 (3038) | Benzoic acid | 3-[N-(3-chloro-phenyl)piperazino]-1-propylamine | 194° C., ethyl acetate-D.M.F. |
| 86 (3165) | Acetic acid | 4-(N-phenyl piperazino)-1-butylamine | 132° C., ethyl acetate. |
| 87 (3110) | do | 3-[N-(4-methyl-phenyl)piperazino]-1-propylamine. | 155° C., ethyl acetate. |
| 88 (3114) | Propionic acid | do | 169° C., ethyl acetate. |
| 89 (3031) | Acetic acid | 3-[N-(2-methyl-phenyl)piperazino]-1-propylamine. | 150° C., ethyl acetate. |
| 90 (3115) | Propionic acid | do | 143° C., ethyl acetate. |
| 91 (3008) | Acetic acid | 3-[N-(3-methyl-phenyl)piperazino]-1-propylamine. | 188° C., Me-Et-Ketone. |
| 92 (3034) | Propionic acid | do | 150° C., ethyl acetate. |
| 93 (3028) | Acetic acid | 3-[N-(4-methoxy-phenyl)piperazino]-1-propylamine. | 132° C., ethyl acetate. |
| 94 (3116) | Propionic acid | do | 163° C., acetone. |
| 95 (3039) | Acetic acid | 2-[N-(4-methoxy-phenyl)piperazino]ethylamine | 153° C., ethyl acetate. |
| 96 (3117) | do | 3-[N-(2-methoxy-phenyl)piperazino]-1-propylamine. | 142° C., ethyl acetate. |
| 97 (3030) | do | 3-[N-(3-methoxy-phenyl)piperazino]-1-propylamine. | 143° C., ethyl acetate. |
| 98 (3033) | Propionic acid | do amine. | 148° C., ethyl acetate. |
| 99 (3036) | Acetic acid | 3-[N-(3-trifluoromethyl-phenyl)-piperazino]-1-propylamine. | 160° C., ethyl acetate. |

propyl, or butyl ester of the same acid; for these latter esters, the duration of reflux should be between 20 and 100 hours.

EXAMPLES 101–111

The compounds defined below are prepared according to one or other of procedures a and b illustrated by the Example 100.

According to procedure a, the acyl group at the 10-position of the acetylated derivatives or the corresponding propionyl derivatives is selectively hydrolysed.

According to procedure b, an (N-aryl piperazino) alkylamine which may be different from 3-(N-(4-chloro-phenol)-piperazino)-propylamine is reacted with an alkyl ester of phenothiazine-3-carboxylic acid. The corresponding compounds are shown in the following Table III.

TABLE III

| Number of example (code) | Tertiary amino-compound | Melting point solvent for recrystallisation |
|---|---|---|
| 100 (3102) | 3-[N-(4-chloro-phenyl)piperazino]-propylamine-1. | 230° C., Me-Et-ketone-D.M.F. |
| 101 (3111) | 3-[N-(2-chloro-phenyl)piperazino]-propylamine-1. | 206° C., Chloroform-D.M.F. |
| 102 (3101) | 3-[N-(3-chloro-phenyl)piperazino]-propylamine-1. | 217° C., Me-Et-ketone-D.M.F. |
| 103 (3112) | 3-[N-(4-methyl-phenyl)piperazino]-propylamine-1. | 212° C., Me-Et-ketone. |
| 104 (3009) | 3-[N-(2-methyl-phenyl)piperazino]-propylamine-1. | 226° C., Me-Et-ketone-D.M.F. |
| 105 (3010) | 3-[N-(3-methyl-phenyl)piperazino]-propylamine-1. | 193° C., Me-Et-ketone. |
| 106 (3029) | 3-[N-(4-methoxy-phenyl)piperazino]-propylamine-1. | 200° C., Me-Et-ketone. |
| 107 (3040) | 2-[N-(4-methoxy-phenyl)piperazino]-ethylamine. | 207° C., Me-Et-ketone-D.M.F. |
| 108 (3118) | 3-[N-(2-methoxy-phenyl)piperazino]-propylamine-1. | 173° C., chloroform. |
| 109 (3035) | 3-[N-(3-methoxy-phenyl)piperazino]-propylamine-1. | 172° C., Me-Et-ketone. |
| 110 (3037) | 3-[N-(3-trifluoro-phenyl)piperazino]-propylamine-1. | 190° C., Ethyl acetate. |
| 111 (3166) | 4-(N-phenyl-piperazino)-butylamine-1. | 202° C., Me-Et-ketone. |

EXAMPLE 112

Process b of Example 100 is also applicable to the preparation of compounds previously described such as 3-(N-phenyl piperazino)-propylamide of phenothiazine-3-carboxylic acid and the 2-(N-phenyl piperazino)ethylamide of the same acid. The 3-(N-(4-chloro-phenyl)-piperazino)-propylamine-1 (0.1 mole) is then replaced respectively by 3-(N-phenyl piperazino)-propylamine-1 (0.1 mole) or 2-(N-phenyl piperazino)-ethylamine (0.1 mole).

EXAMPLE 113

*Methyl ester of phenothiazine-3-carboxylic acid*

A mixture of 125 g. of 3-chloroacetyl-10-propionyl-phenothiazine and 100 ml. of anhydrous pyridine is heated to about 50° C. for about 20 minutes then at about 85° C. for 30 minutes. The excess of pyridine is evaporated off under reduced pressure. The 3-(acetyl pyridinium)-10-propionyl-phenothiazine chloride is taken up in 250 ml. of anhydrous methanol and the solution brought to reflux. There is then added during 10 minutes, maintaining reflux under an inert atmosphere, a solution of sodium methylate prepared from 200 ml. of anhydrous methanol and 10 g. of sodium. The solution of sodium methylate may be added also at room temperature and then the mixture slowly brought to reflux temperature and reflux maintained for 1 hour. There may also be added a methanol solution of the quaternary ammonium derivative to the sodium methylate solution at a temperature between the reflux temperature and room temperature. After 1½ hours of reflux, there is slowly added 3.8 g. of glacial acetic acid, and about 225 ml. of methanol are distilled off. The mixture is cooled, the methyl ester mixed with sodium chloride is filtered off, the product washed with water and dried. The ester may be recrystallised from methyl ethyl ketone. The yield is 85–90%.

EXAMPLES 114–116

*Ethyl, propyl or butyl esters of phenothiazine-3-carboxylic acid*

The same procedure as for Example 113 is followed. The volumes of anhydrous methanol mentioned are merely replaced by the same volumes of anhydrous alcohol (ethanol, propanol or butanol) corresponding to the desired ester.

EXAMPLE 117

*3-(N-phenyl piperazino)-propylamine-1*

To a solution of 1 mole of 3-N,N-di(β-chlorethyl) aminopropylamine-1 dihydrochloride and 1 mole of aniline in two liters of methanol there are added, respectively after 6 hours, 14 hours and 22 hours of reflux, 1 mole, 0.5 mole and 0.5 mole of aniline. Reflux is continued throughout 28 hours. The reaction may be accelerated by adding a little alkali metal iodide as catalyst. The methanol is then evaporated under reduced pressure. The residue is taken up in 1500 ml. of water, the product is salted out by the addition of sodium hydroxide and extracted with chloroform. The chloroform solution is dried, the chloroform evaporated off under reduced pressure and the residue is rectified under a good vacuum.

Following the same proceure but replacing aniline as the case may be by anilines having substituents on the phenyl nucleus, and the dihydrochloride of 3-N,N-di(β-chloro-ethyl) amino propylamine-1 by the dihydrochloride of 4-N,N-di(β-chlorethyl) amino-butylamine-1 or that of 2-N,N-di(β-chlorethyl) amino-ethylamine, there are prepared:

(a) Known (N-aryl piperazino) alkanol amines such as the 4-(N-phenyl piperazino)-butylamine-1
3-(N-(2-chlorophenyl)-piperazino)-propylamine-1
3-(N-(4-chlorophenyl)-piperazino)-propylamine-1
3-(N-(4-methylphenyl)-piperazino)-propylamine-1
3-(N-(4-methoxyphenyl-piperazino)-propylamine-1
2-(N-phenyl piperazino)-ethylamine (b) New (N-aryl) piperazino alkylamines identified in the following Table IV.

TABLE IV

| (N-aryl piperazino) alkylamine | Yield, percent | Boiling point | 25_D_n |
|---|---|---|---|
| 3-[N-(3-chloro-phenyl) piperazino]-propylamine-1. | 67 | 150–155° C. (0.04 mm.) | 1.573 |
| 3-[N-(2-methyl-phenyl)-piperazino]-propylamine-1. | 52 | 127–133° C. (0.05 mm.) | 1.547 |
| 3-[N-3-methyl-phenyl) piperazino]-propylamine-1. | 58 | 139–144° C. (0.05 mm.) | 1.555 |
| 3-[N-(2-methoxy-phenyl) piperazino]-propylamine-1. | 68 | 151–154° C. (0.07 mm.) | 1.535 |
| 3-[N-(3-methoxy-phenyl) piperazino]-propylamine-1. | 77 | 158–162° C. (0.05 mm.) | 1.559 |
| 3-[N-(3-trifluoromethyl-phenyl) piperazino]-propylamine-1. | 24 | 135–140° C. (0.05 mm.) | 1.516 |
| 2-[N-(4-methoxy-phenyl) piperazino]-ethylamine. | 42 | 148–152° C. (0.05 mm.), M.P., 35–40°. | |

The dihydrochloride of 3-N,N-di(β-chlorethyl)amino-propylamine-1 which serves as starting material may be prepared in the following manner.

To 950 ml. of thionyl chloride there is added slowly and with stirring 235 g. of 3-N,N-di (β-hydroxyethyl) amino-propylamine-1 dihydrochloride.

The mixture is stirred for 20 hours at room temperature. The excess of thionyl chloride is evaporated under reduced pressure at a temperature below 40° C. The residue is taken up, with cooling, in 250 ml. of methanol. The crystalline product is filtered. The yield is 92%, the melting point 154° C. The pure product has a melting point of 159° C. after recrystallisation from methanol.

EXAMPLE 118

*Preparation of 3(N-methyl-piperazino)-propylamide of 10-butyryl-phenothiazine-3-carboxylic acid*

To a chloroform solution of 33.1 g. of 10-butyryl-phenothiazine-3-carboxylic acid chloride is added 3-(N- methylpiperazino)-1-propylamine (or its monohydrochloride) in an amount calculated to form the amide and to neutralise the hydrochloric acid formed. The mixture is stirred for about 3 hours, the chloroform is evaporated, the residue taken up in dilute aqueous hydrochloric acid, the solution is subjected to extraction with ether and the aqueous phase neutralised with an alkali carbonate, which causes the desired compound to be precipitated. It is isolated by extraction by means of one of its solvents, to wit chloroform, then the solvent is removed by distillation under reduced pressure. The residue is recrystallised.

In the Table V below there are listed the principal characteristics of the basic compounds and salts thereof:

TABLE V

| Order No. (Code No.) | Formula | M.P. (state, in the case of a noncrystalline compound) solvent for crystallisation | Acid addition salt, M.P., solvent for crystallisation |
|---|---|---|---|
| 119 (3131) | 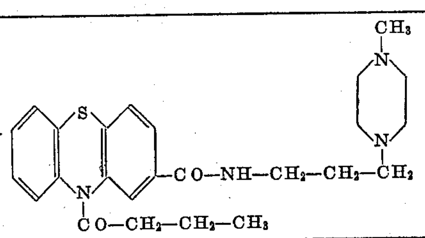 | 80-90° C. (amorphous) | Dihydrochloride, 215-220° C., ethanol/ethyl acetate. |
| 120 (3142) | 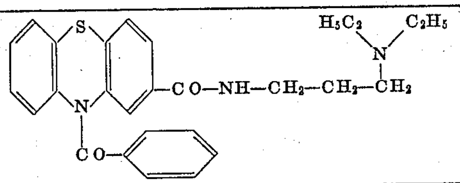 | 80-90° C. (amorphous) | Neutral fumarate, 158° C., ethanol. |
| 121 (3143) | 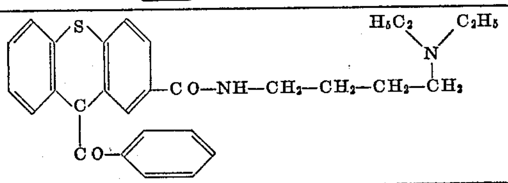 | 115° C. (ethylacetate) | Hydrochloride, 172-174° C., acetone. |
| 122 (3133) | 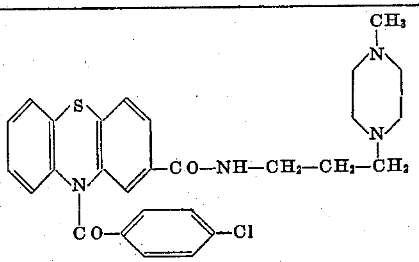 | 110-120° C. (amorphous) | Dihydrochloride, 225-235° C., ethanol/ethyl acetate. |
| 123 (3135) | 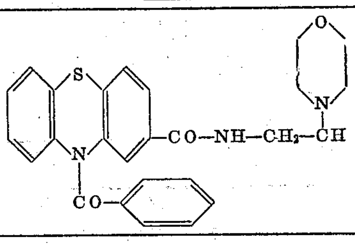 | 176° C. (acetone) | Hydrochloride; 255-260° C.; methanol. |
| 124 (3140) | 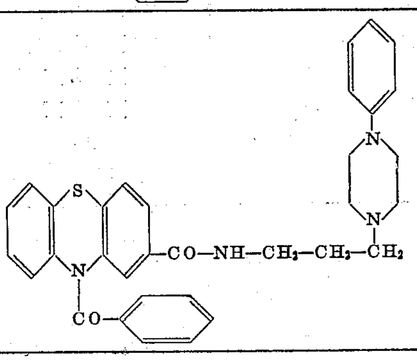 | 194° C. (dimethyl formamide) | |

TABLE V—Continued

| Order No. (Code No.) | Formula | M.P. (state, in the case of a noncrystalline compound) solvent for crystallisation | Acid addition salt, M.P., solvent for crystallisation |
|---|---|---|---|
| 125 (3141) | 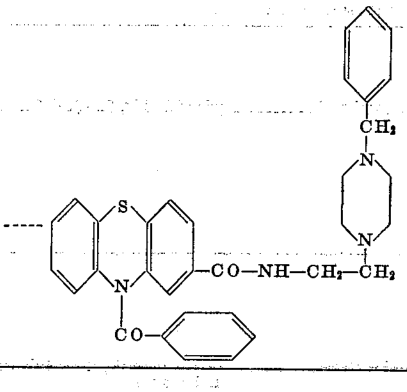 | 30–40° C. (amorphous) | Dihydrochloride, 218–220° C., methanol. |
| 126 (3136) | 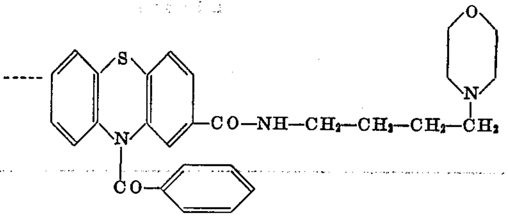 | 148° C. (ethyl acetate) | Acid fumarate, 217° C., ethanol. |
| 127 (3137) | 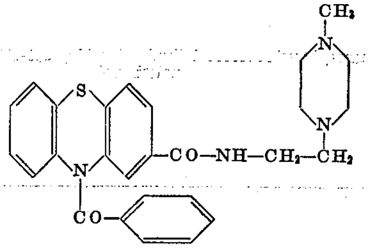 | 173° C. (ethyl acetate) | Dihydrochloride, 238–242° C., methanol. |
| 128 (3139) | 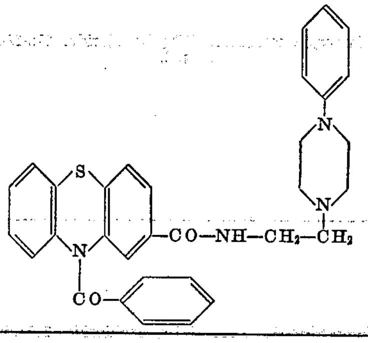 | 178° C. (methyl ethyl ketone). | |
| 129 (3132) | 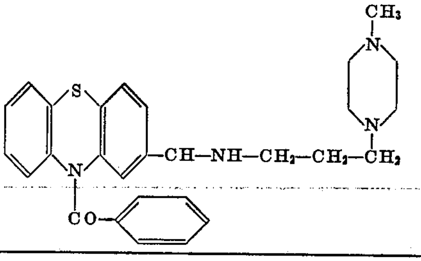 | 95–100° C. (amorphous) | Dihydrochloride, 214–218° C., ethanol/ethyl acetate. |
| 130 (3138) | 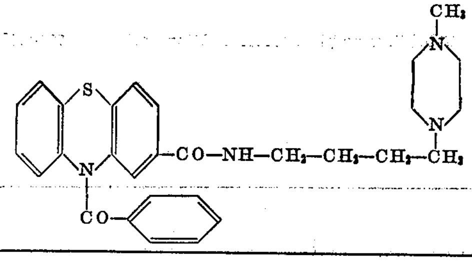 | 90–95° C. (amorphous) | Dihydrochloride, 232–238° C., methanol. |

TABLE V—Continued

| Order No. (Code No.) | Formula | M.P. (state, in the case of a noncrystalline compound) solvent for crystallisation | Acid addition salt, M.P., solvent for crystallisation |
|---|---|---|---|
| 131 (3134) | 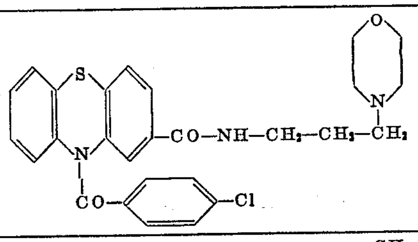 | 80-90° C. (amorphous) | Hydrochloride, 226-228° C., ethanol. |
| 132 (3146) | 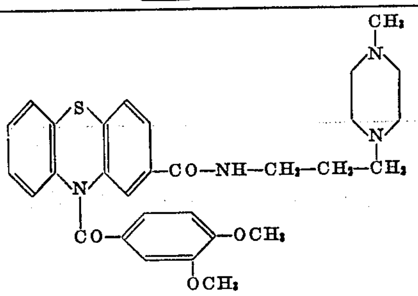 | 162° C., ethyl acetate | Dihydrochloride, 206-210° C., methanolethanol. |
| 133 (3147) | 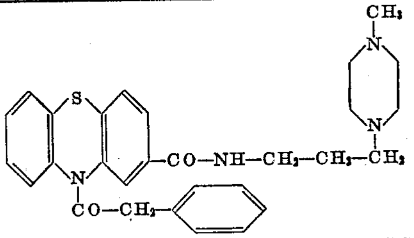 | 80-90° C. (amorphous) | Dihydrochloride, 222-225° C., methanolethanol. |
| 134 (3148) | 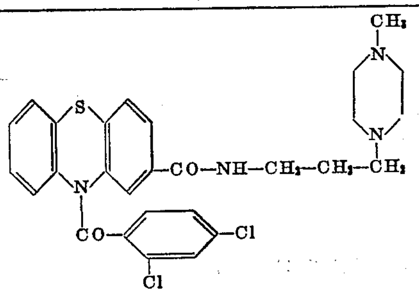 | 90-100° C. (amorphous) | Dihydrochloride, 230-250° C., methanol. |
| 135 (3149) | 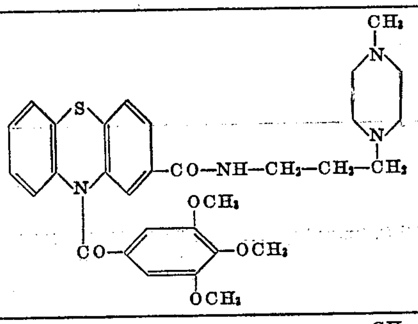 | 80-90° C. (amorphous) | Dihydrochloride, 215-230° C., ethanol. |
| 136 (3150) | 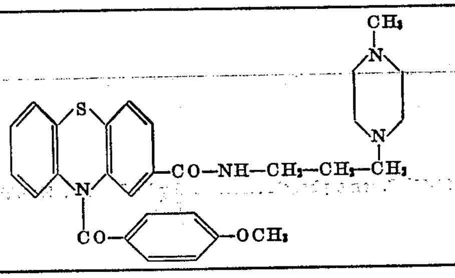 | 80-90° C. (amorphous) | Dihydrochloride, 200-220° C., ethanol. |

TABLE V—Continued

| Order No. (Code No.) | Formula | M.P. (state, in the case of a noncrystalline compound) solvent for crystallisation | Acid addition salt, M.P., solvent for crystallisation |
|---|---|---|---|
| 137 (3161) | 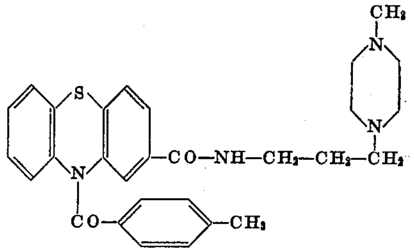 | 80–90° C. (amorphous) | Dihydrochloride, 200–215° C., ethanol. |
| 138 (3162) | 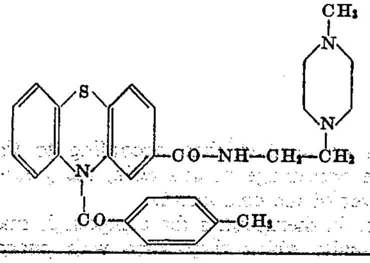 | 160–162° C. (ethyl acetate) | Dihydrochloride, 230–245° C., 95% ethanol. |
| 139 (3163) | 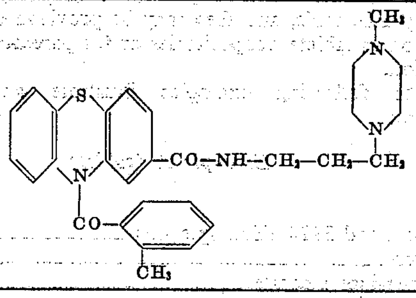 | 80–90° C. (amorphous) | Dihydrochloride, 235–250° C., 95% ethanol. |
| 140 (3164) | 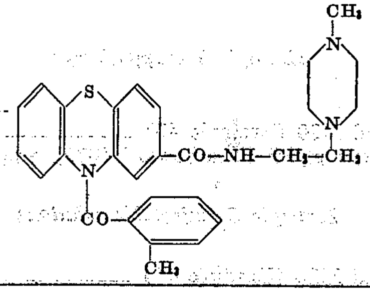 | 105–110° C. (amorphous) | Dihydrochloride, 260–270° C., 90% ethanol. |
| 141 (3167) | 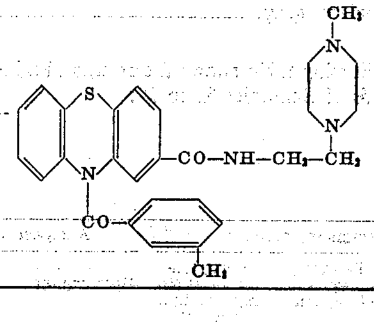 | 172–174° C. (ethyl acetate) | Dihydrochloride, 220–235° C., 90% ethanol. |

The above compounds may be used for therapeutic purposes or as intermediates in the synthesis of other compounds.

The following table shows the toxicity and anti-inflammatory activity compared with phenylbutazone for the compounds of Examples 25 to 44.

| Example No. (code number) | $LD_{50}$, mouse | | Anti-inflammatory activity | | |
|---|---|---|---|---|---|
| | | | New Substance | | Phenylbutazone, 150 mg./i.p., percentage diminution of oedema, percent |
| | Route | Dose, mg./kg. | Dose, mg./kg., i.p. | Percentage diminution of oedema, percent | |
| 25 (3121) | i.p.> | 2,000 | 300 | 14.7 | 7 |
| 26 (3129) | i.p. | 266 | 100 | 29 | 15 |
| 27 (3187) | i.p. | 275 | 150 | 50 | 19 |
| 28 (3191) | i.v. | 150 | 100 | 33 | 26 |
| 29 (3127) | i.v. | 35 | 25 | 11.5 | 11 |
| 30 (3125) | i.v. | 150 | 100 | 38 | 8 |
| 31 (3189) | i.v. | 96 | 75 | 37 | 17 |
| 32 (3124) | i.v. | 75 | 25 | 15 | 13 |
| 33 (3190) | i.v. | 132 | 100 | 63 | 18.5 |
| 34 (3128) | i.p. | 133.4 | 50 | 16.6 | 14 |
| 35 (3123) | i.p. | 327 | 150 | 64 | 25 |
| 36 (3188) | i.v. | 46 | 25 | 21 | 17 |
| 37 (3122) | i.p.> | 2,500 | 300 | 21 | 14.5 |
| 38 (3192) | i.v. | 163 | 140 | 43 | 2.8 |
| 39 (3178) | i.v. | 125 | 100 | 30 | 17 |
| 40 (3120) | i.v. | 187 | 150 | 65 | 25 |
| 41 (3126) | i.v. | 125 | 50 | 40 | 11 |
| 42 (3197) | i.v. | 160 | 100 | 59 | 26 |
| 43 (3130) | i.p. | 1,000 | 300 | 31 | 18 |
| 44 (3195) | i.p. | 1,200 | 300 | 54 | 26 |

There have been measured, for the compounds shown in a previous table, the acute toxicity, expressed by the 50 percent lethal dose ($LD_{50}$), the anti-inflammatory activity and the analgesic activity. In these measurements the acute toxicity was measured in the mouse (intravenous administration) according to the method of Karber and Behrens, and the anti-inflammatory activity according to the inhibition of generalised oedema caused by the injection of ovalbumin in the rat, phenylbutazone being used as the reference substance.

The analgesic activity was measured according to the painful abdominal cramp test caused by phenyl benzoquinone in the mouse as described in "Il Farmaco ed. Prat. 1961, 16, 232–239"; the results are listed in Table VI which follows.

TABLE VI

| Number | | Dose used | | Analgesia (percentage of animals not protected) |
|---|---|---|---|---|
| Example | Code | Mg./kg. | Route | |
| 25 | 3121 | 100 | i.p. | 40 |
| 26 | 3129 | 130 | i.p. | 29 |
| 27 | 3187 | 50 | i.p. | 17 |
| 28 | 3191 | 50 | i.v. | 37.5 |
| 29 | 3127 | 15 | i.v. | 42.5 |
| 30 | 3125 | 50 | i.v. | 40 |
| 31 | 3189 | 50 | i.v. | 47.5 |
| 32 | 3124 | 30 | i.v. | 27.5 |
| 33 | 3190 | 60 | i.v. | 43.5 |
| 34 | 3128 | 60 | i.p. | 22 |
| 35 | 3123 | 50 | i.p. | 10 |
| 37 | 3122 | 150 | i.p. | 29 |
| 38 | 3192 | 80 | i.v. | 32 |
| 39 | 3178 | 80 | i.v. | 39 |
| 40 | 3120 | 90 | i.p. | 40 |
| 41 | 3126 | 60 | i.v. | 40 |
| 42 | 3197 | 80 | i.v. | 40 |
| 43 | 3130 | 100 | i.p. | 16 |
| 44 | 3195 | 20 | i.p. | 29 |

It will be recalled that, according to this test, the lower the percentage of analgesia, the greater the analgesic power of the compound.

For use in therapeutics the compounds may be in the form of salts which they form with pharmaceutically acceptable acids, and they may be provided for administration as tablets, suppositories or for parenteral administration.

The following examples illustrate administerable forms:

*Example A (tablet)*

| | G. |
|---|---|
| Compound 3120 (Example 40) | 0.04 |
| Starch | 0.0575 |
| Magnesium stearate | 0.0025 |

*Example B (suppository)*

| | G. |
|---|---|
| Compound 3120 (Example 40) | 0.05 |
| Polyethylene glycol ("Carbowax" 4000) q.s.p. | 2 |

*Example C (injectable solution)*

| | | |
|---|---|---|
| Compound 3120 (Example 40) | g. | 0.10 |
| Distilled water q.s.p. | ml. | 2 |

The following table shows the results obtained with the compounds of Examples 69 to 78:

| Number | | $LD_{50}$, mg./kg. | Anti-inflammatory activity | | | Analgesic activity | |
|---|---|---|---|---|---|---|---|
| Code | Example | | Dose, i.p., mg./kg. | Percent diminution of oedema | Phenylbutazone at 150 mg./kg., i.p., percent | Dose, mg./kg. | Analgesia, percent |
| 3146 | 69 | 134 i.p. | 50 | 38 | 6.3 | 80 i.p. | 25 |
| 3147 | 70 | 108 i.p. | 50 | 46 | 6.3 | 80 i.p. | 25 |
| 3148 | 71 | 144 i.p. | 50 | 39.5 | 6.3 | 75 i.p. | 22.5 |
| 3149 | 72 | 27.5 i.v. | 15 | 11.3 | 6.3 | 15 i.v. | 70 |
| 3150 | 73 | 92 i.v. | 50 | 37.5 | 8.8 | 50 i.v. | 55 |
| 3161 | 74 | 71 i.v. | 25 | 22 | 8.8 | 70 i.p. | 10 |
| 3162 | 75 | 175 i.p. | 100 | 61 | 10 | 90 i.p. | 7.5 |
| 3163 | 76 | 71 i.v. | 50 | 42 | 9.6 | 70 i.p. | 5 |
| 3164 | 77 | 167 i.p. | 50 | 30 | 9.6 | 80 i.p. | 7.5 |
| 3167 | 78 | 188 i.p. | 80 | 43 | 27 | 95 i.p. | 17.5 |

The following table shows the toxicities, and the anti-inflammatory and analgesic activities of the compounds of Examples 119 to 141:

| Example No. (Code No.) | Toxicity, $LD_{50}$ in mg./kg. | Anti-inflammatory activity | | | Analgesic activity | |
|---|---|---|---|---|---|---|
| | | Dose, i.p. in mg./kg. | Percent of reduction of oedema | Phenylbutazone at 150 mg./kg., i.p., percent | Dose, mg./kg. | Analgesia, percent |
| 119 (3131) | 133 i.v. | 100 | 51 | 15 | 70 i.v. | 46 |
| 120 (3142) | 72 i.p. | 30 | 40 | 30 | 30 i.p. | 32.5 |
| 121 (3143) | 22 i.v. | 10 | 13 | 13 | 10 i.v. | 32.5 |
| 122 (3133) | 87.5 i.v. | 75 | 42 | 14 | 45 i.v. | 58 |
| 123 (3135) | 480 i.p. | 250 | 58 | 29 | 200 i.p. | 22.5 |
| 124 (3140) | 2500 i.p. | 300 | 28 | 13 | 300 i.p. | 18 |
| 125 (3141) | 375 i.p. | 200 | 26 | 26 | 125 i.p. | 19 |
| 126 (3136) | 434 i.p. | 150 | 41 | 13 | 200 i.p. | 45 |
| 127 (3137) | 245 i.p. | 100 | 47 | 15 | 125 i.p. | 8 |
| 128 (3139) | 2500 i.p. | 300 | 8 | 13 | 150 i.p. | 19.5 |
| 129 (3132) | 92 i.p. | 50 | 31 | 15 | 45 i.v. | 53 |
| 130 (3138) | 47 i.v. | 30 | 31 | 13 | 20 i.v. | 25 |
| 131 (3134) | 288 i.p. | 150 | 40 | 13 | 140 i.p. | 15 |
| 132 (3146) | 134 i.p. | 50 | 38 | 6.3 | 80 i.p. | 25 |
| 133 (3147) | 108 i.p. | 50 | 46 | 6.3 | 80 i.p. | 25 |
| 134 (3148) | 144 i.p. | 50 | 39.5 | 6.3 | 75 i.p. | 22.5 |
| 135 (3149) | 27.5 i.v. | 15 | 11.3 | 6.3 | 15 i.v. | 70 |
| 136 (3150) | 92 i.v. | 50 | 37.5 | 8.8 | 50 i.v. | 55 |
| 137 (3161) | 71 i.v. | 25 | 22 | 8.8 | 70 i.p. | 10 |
| 138 (3162) | 175 i.p. | 100 | 61 | 10 | 90 i.p. | 7.5 |
| 139 (3163) | 71 i.v. | 50 | 42 | 9.6 | 70 i.p. | 5 |
| 140 (3164) | 167 i.p. | 50 | 30 | 9.6 | 80 i.p. | 7.5 |
| 141 (3167) | 188 i.p. | 80 | 43 | 27 | 95 i.p. | 17.5 |

It will be reminded that the figures for analgesia represent the percentage of unprotected animals; consequently the lower the figure, the higher the analyesic activity of the corresponding compound.

The compounds of Examples 119 to 141 may be used as anti-inflammatory, analgesic or anti-pyretic agents in the form of salts which they form with pharmaceutically accepetable acids. Administerable forms which may be used are tablets, suppositories and injectable liquids.

The following examples illustrate administerable forms:

*Example D (tablet)*

| | G. |
|---|---|
| Compound 3132 | 0.04 |
| Starch | 0.0575 |
| Magnesium stearate | 0.0025 |

*Example E (suppository)*

| | G. |
|---|---|
| Compound 3132 | 0.05 |
| Polyethylene glycol ("Carbowax" 4000) q.s.p. | 2 |

*Example F (injectable solution)*

| | |
|---|---|
| Compound 3132 g. | 0.10 |
| Distilled water, q.s.p. ml. | 2 |

In the preceding examples, the active substance is the compound No. 3132, that is to say 3-(N-methyl-piperazino)-propylamide of 10-benzoyl-phenothiazine-3-carboxylic acid.

What I claim is:

1. A compound having the formula (a)

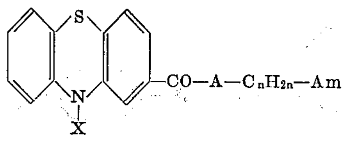

wherein X is H, $COCH_3$, $COCH_2CH_3$,

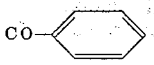 or 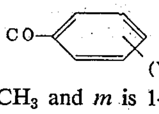

wherein V is Cl, $CH_3$ or $OCH_3$ and $m$ is 1–3, A is 0 or NH, $n$ is 2, 3 or 4, Am is

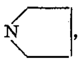, 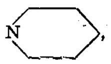, 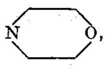, 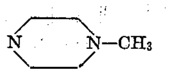

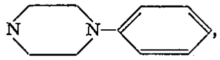, or 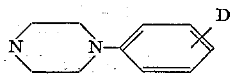

wherein D is Cl, $CH_3$, $OCH_3$ or $CF_3$ or (b) a non-toxic acid addition salt thereof.

2. A compound according to claim 1 wherein X is H.

3. A compound according to claim 1 wherein X is $COCH_3$.

4. A compound according to claim 1 wherein X is $COCH_2CH_3$.

5. A compound according to claim 1 wherein X is

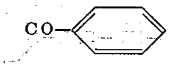

6. A compound according to claim 1 wherein X is

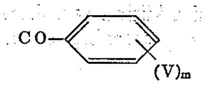

where V is Cl, $CH_3$, or $OCH_3$ and $m$ is 1–3.

7. A compound according to claim 1 wherein A is 0.

8. A compound according to claim 1 wherein A is NH.

9. A compound according to claim 1 wherein $n$ is 2.

10. A compound according to claim 1 wherein $n$ is 3.

11. A compound according to claim 1 wherein Am is

12. A compound according to claim 1 wherein Am is

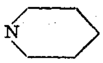

13. A compound according to claim 1 wherein Am is

14. A compound according to claim 1 wherein Am is

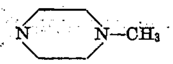

15. A compound according to claim 1 wherein Am is

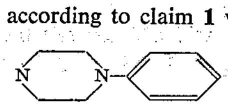

16. A compound according to claim 1 wherein Am is

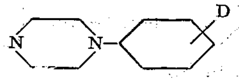

and D is Cl, $CH_3$, $OCH_3$ or $CF_3$.

17. A compound according to claim 1 having the formula

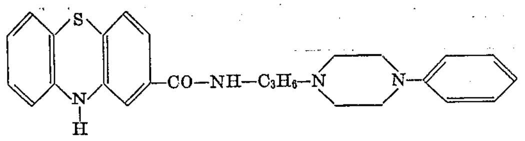

or a non-toxic acid addition salt thereof.

18. A compound according to claim 1 having the formula

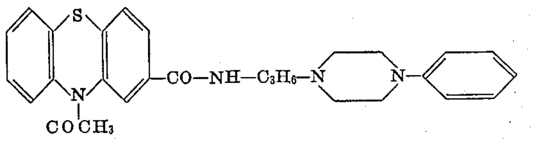

or a non-toxic acid addition salt thereof.

19. A compound according to claim 1 having the formula

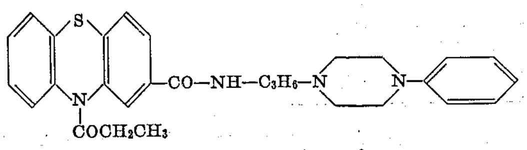

or a non-toxic acid addition salt thereof.

20. A compound according to claim 1 having the formula

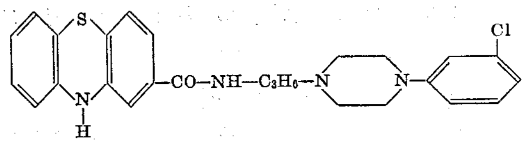

or a non-toxic acid addition salt thereof.

21. A compound according to claim 1 having the formula

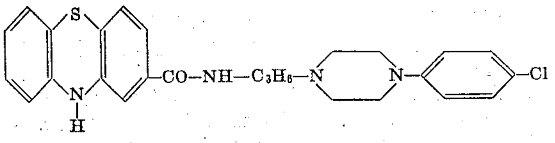

or a non-toxic acid addition salt thereof.

22. A compound according to claim 1 having the formula

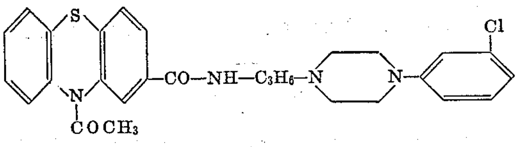

or a non-toxic addition salt thereof.

23. A compound according to claim 1 having the formula

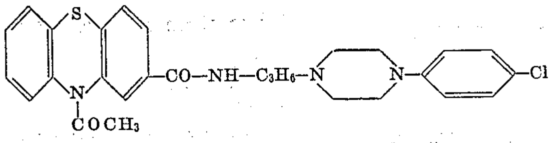

or a non-toxic acid addition salt thereof.

24. A compound according to claim 1 having the formula

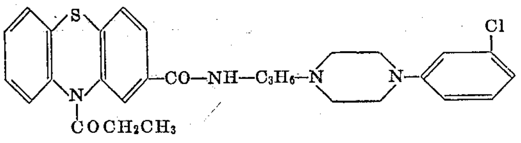

or a non-toxic acid addition salt thereof.

25. A compound according to claim 1 having the formula

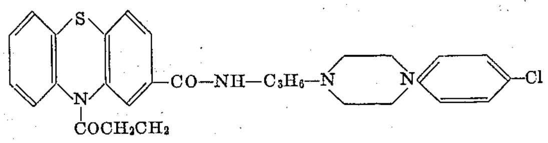

or a non-toxic acid addition salt thereof.

26. A compound according to claim 1 having the formula

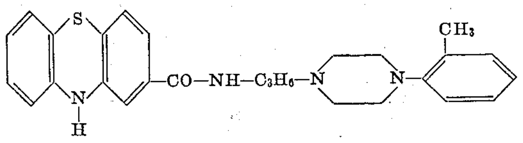

or a non-toxic acid addition salt thereof.

27. A compound according to claim 1 having the formula

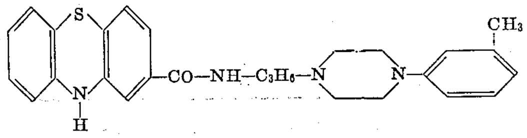

or a non-toxic acid addition salt thereof.

28. A compound according to claim 1 having the formula

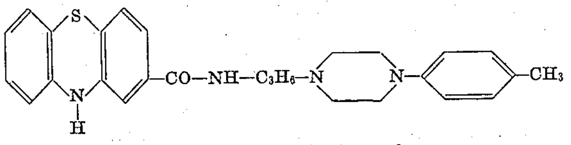

or a non-toxic acid addition salt thereof.

29. A compound according to claim 1 having the formula

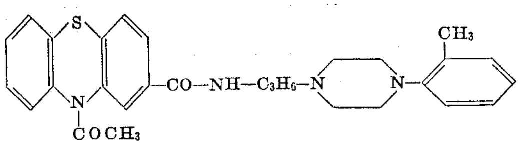

or a non-toxic acid addition salt thereof.

30. A compound according to claim 1 having the formula

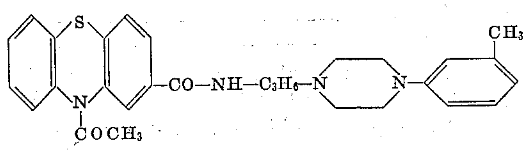

or a non-toxic acid addition salt thereof.

31. A compound according to claim 1 having the formula

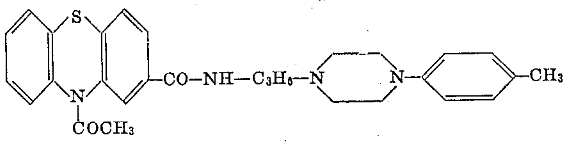

or a non-toxic acid addition salt thereof.

32. A compound according to claim 1 having the formula

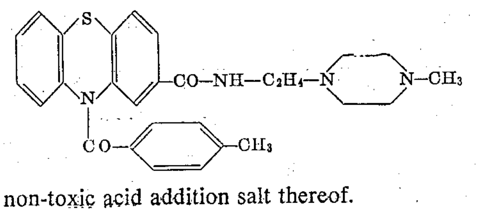

or a non-toxic acid addition salt thereof.

33. A compound according to claim 1 having the formula

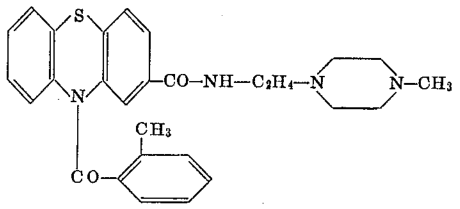

or a non-toxic acid addition salt thereof.

34. A compound according to claim 1 having the formula

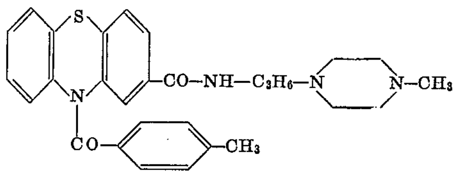

or a non-toxic acid addition salt thereof.

35. A compound according to claim 1 having the formula

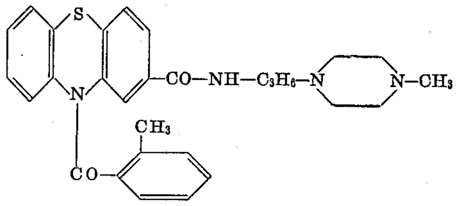

or a non-toxic acid addition salt thereof.

36. A compound according to claim 1 having the formula

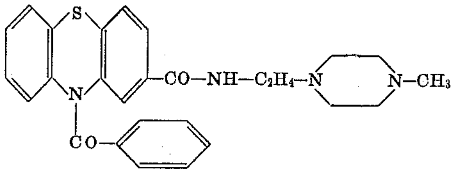

or a non-toxic acid addition salt thereof.

37. A compound according to claim 1 having the formula

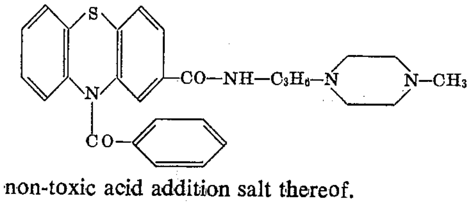

or a non-toxic acid addition salt thereof.

References Cited

UNITED STATES PATENTS 2,956,996 10/1960 Craig -------------- 260—243

OTHER REFERENCES

De Antoni: Bull., Soc. Chim. France, pp. 2214–16 (September 1964).

Kano et al.: Pharm. Bull. (Tokyo), vol. 5, pp. 389–96 (1957).

JOHN D. RANDOLPH, *Primary Examiner.*

WALTER A. MODANCE, *Examiner.*

H. I. MOATZ, *Assistant Examiner.*